March 23, 1943.    M. JENTER    2,314,790
FOLDER
Filed April 15, 1942    3 Sheets-Sheet 1
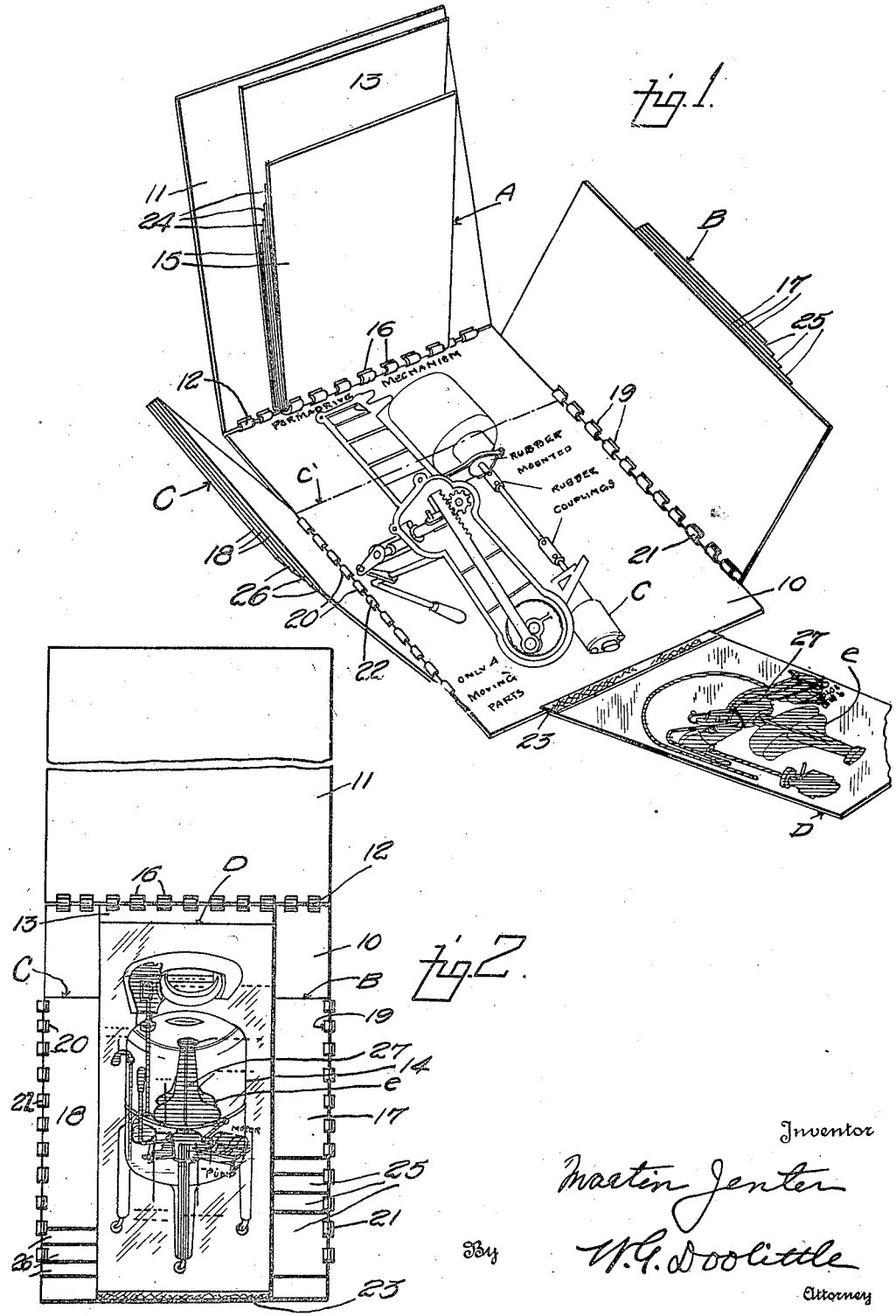

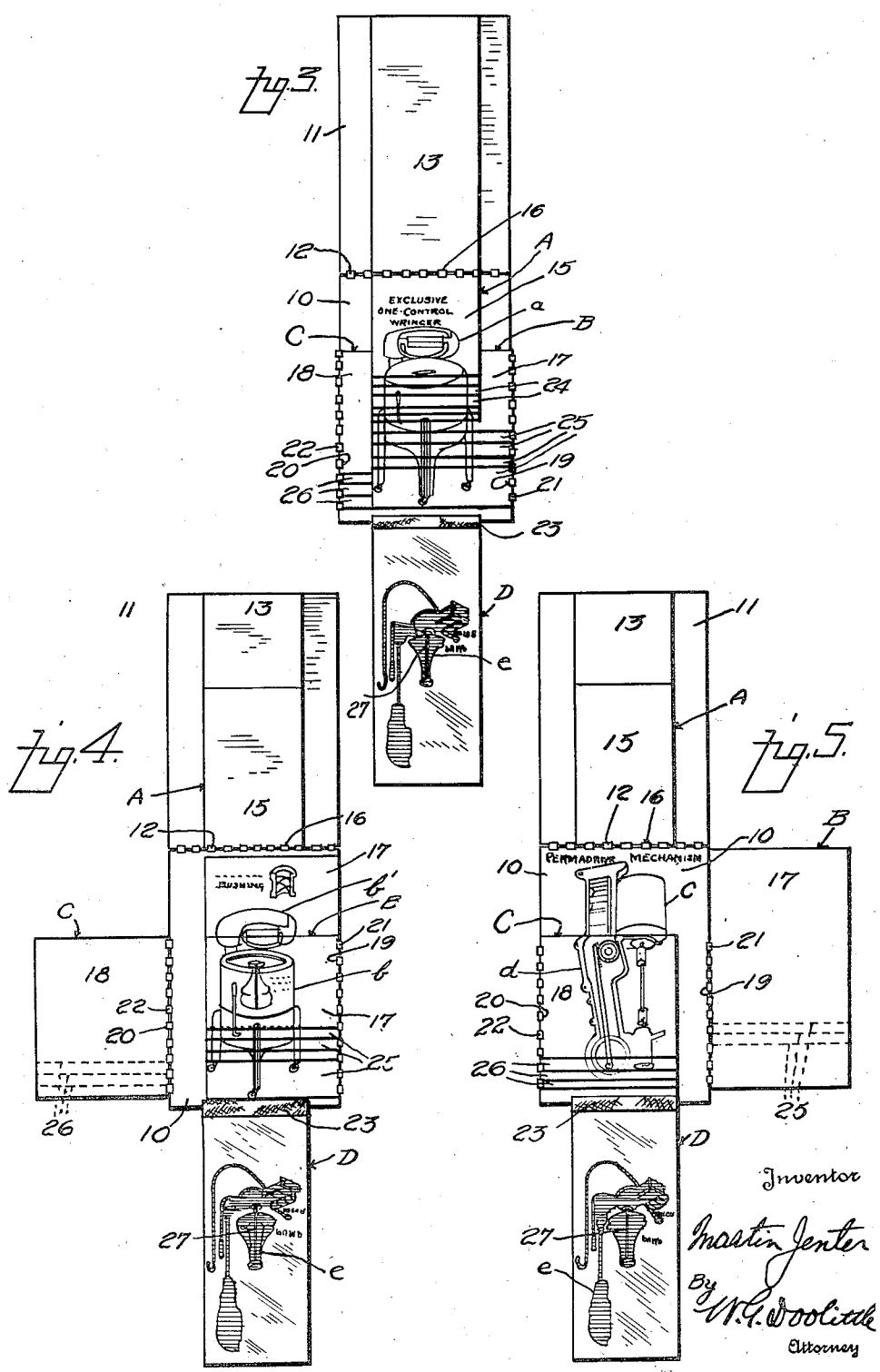

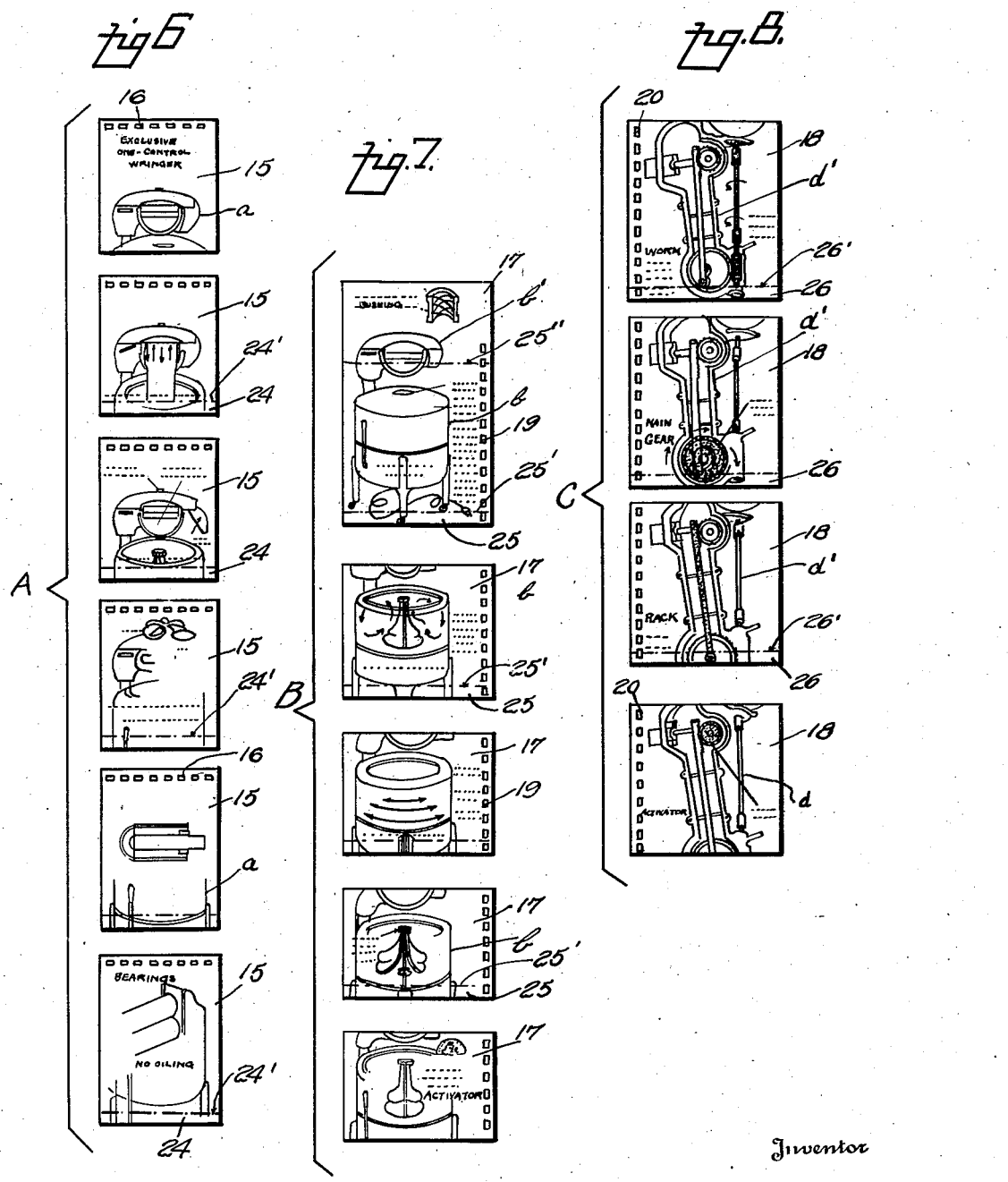

Patented Mar. 23, 1943

2,314,790

UNITED STATES PATENT OFFICE 2,314,790

FOLDER

Martin Jenter, Pelham, N. Y., assignor to Jenter Corporation, Ridgefield, N. J., a corporation of New Jersey Application April 15, 1942, Serial No. 439,046

11 Claims. (Cl. 35—54)

My invention relates to a folder for uses such as in demonstrating and selling a machine or other article; in giving instructions in the use, care and/or maintenance of a machine or other article, and in explaining and generally teaching and educating owners, prospects, students or anyone with regard to any subject, or phases thereof, to enable a more rapid exposition, transmission and mental acquisition of the subject or matter involved.

In carrying out the invention, an object is to provide a novel correlation of picture, instruction or demonstration sheets and one or more novel diaphanous locators for disposition over and in instructing and demonstrating coaction with each of the said sheets.

Another aim is to provide such a folder wherein the picture, instruction or demonstration sheets present pictures or delineations to be viewed in succession, the sheets being stepped with picture portions on the steps supplementing and completing the pictures of the sheets disposed above the same, and with the portions of the pictures not exposed on the steps supplementing and completing those of the steps and being normally concealed by the sheet next above the same. In this manner I am able to make all pictures of a group of sheets of a greater dimension than the corresponding dimension of the smaller sheet.

In addition, an object is to provide a folder or book containing a plurality of the aforesaid groups or series of sheets hinged on different axes and with the sheets of one group stepped in continuation of the steps of the sheets of the group next above the same to thereby effect the dimension-increasing function not only for the same or common picture or series of the second group but for each and both groups or series.

The additional and more specific objects and advantages will in part be pointed out and become apparent from a consideration of the following description of an operative embodiment disclosed in accompanying drawings, wherein:

Fig. 1 is a perspective view of the folder with the cover, groups of leaves, title page and locator open;

Fig. 2 is a plan view of the folder with the cover open and broken away;

Fig. 3 is a plan view of the folder with the cover, title page and locator open;

Fig. 4 is a plan view of the folder with the washing machine per se group exposed for view, and the remainder of the folder open;

Fig. 5 is a plan view of the folder with the activator and drive mechanism group exposed for view, and the remainder of the book open;

Fig. 6 is a collective plan view showing the picture faces of the individual leaves constituting the wringer group;

Fig. 7 is a collective plan view showing the picture faces of the individual leaves constituting the washing machine per se group; and Fig. 8 is a collective plan view showing the picture faces of the individual leaves constituting the activator and drive mechanism group.

Referring specifically to the drawings wherein like reference characters designate like or corresponding parts in the different views, a rectangular back or support of paper, pasteboard or other suitable material is shown at 10 optionally employing a cover 11 of similar material usually coextensive therewith attached along one edge by any suitable hinge at 12. At 13, an optionally employed leaf or picture sheet, for instance of paper, usually of less width than the cover 11 but of the same length is secured in place by the aforesaid hinge 12. This leaf 13 on its front or outer face, as best shown in Fig. 2, contains a suitable picture, drawing or other illustration 14 with or without legends, pertaining to the article, method, or other subject treated or under consideration or discussion in accordance with the invention, and this leaf is in general a title page. In the present example, the invention constitutes a manual for use primarily by salesmen in demonstrating the construction, care and operation of a washing machine such as is used for home laundry purposes and accordingly illustration 14 is of a washing machine. At the same time it is to be borne in mind that the folder may treat of any other machine, method or subject, by way of demonstration, use, care, maintenance, as a text book, or for the imparting of knowledge or instructing students or others.

A plurality of groups or series of leaves or sheets, for instance of paper, are employed at A, B and C, each group dealing with a different phase, angle, point or submechanism or subcombination of the subject or matter treated. In the case of the washing machine, group A concerns the wringer and the salient points and parts thereof and the taking apart of the constituent elements of the same; group B concerns the functions of the washing machine per se, its construction, features and its salient points, and group C relates to the activator and drive mechanism of the washing machine per se and the wringer. The leaves 15 constituting group A have openings 16 along their upper edges in which the aforesaid hinge 12 is threaded. In the cases of groups B and C, the leaves are designated 17 and 18, respectively, and they have openings 19 and 20 entered by hinges 21 and 22, respectively, also threaded in corresponding openings adjacent the opposite side edges of the back or support 10, the leaves of groups B and C thus being hinged on parallel axes but at right angles to the hinge or axis 12 of the leaves of group A. In the closed condition of the folder, group C is flat and superposed directly on back or support 10, group B is flat and superposed directly on group C and group A is flat and superposed directly on group B, while leaf 13 and cover 11 rest flat and are superposed on each other and on group A.

To the lower edge of back or support 10, I connect by any suitable hinge means, such as a strip of textile fabric 23, a diaphanous leaf or sheet D which I term a locator and which is shown of dimensions approximating the width of leaf 13 and the length of the back or support 10.

With more specific reference to group A, it will be noted that the uppermost leaf 15 is the shortest, that the upper edges of all leaves 15 are in registry, and that each leaf 15 beneath the uppermost leaf progressively increases in length and steps 24 are thus provided at the lower edges of all leaves 15 beneath the uppermost one. The upper limits of steps 24 on the respective leaves 15 are indicated by dot-dash lines 24' in Fig. 6. As well shown in Fig. 3, a picture, drawing or illustration of a washing machine, including a wringer, is delineated on and common to the uppermost leaf 15 and all steps 24. In addition, referring in particular to Fig. 6, each leaf 15 having a step 24, has pictured, drawn or illustrated matter thereon at *a* concerning the wringer which is normally concealed by the leaf 15 next above it and which completes or supplements the pictured, drawn or illustrated matter of its step. Thus all leaves 15 coact in providing a complete picture and the remainder of the leaves after any one or any plurality of them are opened, provide a complete picture and all or most leaves alone may present a complete picture.

Referring now to group B comprising leaves 17, all of these are disposed, as best shown in Figure 3, as stepped progressively at 25 below the dot-dash lines 25' in Fig. 7, at their lower portions, below and in continuation of the steps 24 and they have delineated thereon picture portions which are parts of the same or common picture as provided on uppermost leaf 17 and steps 24. Also each leaf 17 has picture portions *b* above dot-dash lines 25' related to the washing and agitating function and supplementing the picture portion of its step so that each leaf 17 has a complete picture thereon composed of the lower or portion on its step and the portion *b*. The lowermost leaf 17 may extend above the other leaves 17 at the line indicated at 25" and the picture portion *b* thereon extended above the other leaves 17 at *b'* to supplement or complete the upper extremities of the picture portions *b* of all other leaves 17.

In dealing with group C concerning the activator and drive mechanism, this may optionally be considered as including the back or support 10, noting Figs. 1 and 5. On the inner surface of the support 10, there is a relatively large picture of such mechanism at *c* (Figure 1) and the upper edges of all of the leaves 18 are spaced below the upper edge of the back 10 and all leaves 18 below the uppermost one are progressively longer or stepped downwardly at 26, the upper limits of the steps being indicated by dot-dash lines 26'. On the said uppermost leaf 18 is a picture *d* and such picture is lengthened or continued downwardly by picture portions on the successive steps 26. At the same time, said picture portions on steps 26, respectively, form parts of other pictures *d'* normally concealed by the leaves 18 superposed thereon. In addition, the upper portion of picture *c* on support 10, which extends above sheets 18, that is in the zone above dot-dash line *c'*, is common to the pictures *d* and *d'*, all in the shown example relating to the activator and drive mechanism.

With the exception of the diaphanous locator D, all leaves including the back and cover are opaque. This locator is transparent and made, for example, of cellulose acetate although in some instances it may, in whole or in part be translucent. On the inner surface of the locator, that is the surface thereof which is viewed in Figures 1 and 3 to 5, I provide a picture or drawing *e* related to the subject treated by the folder as through the use of black or other lines to indicate outlines, margins, shapes, etc., at 27, which picture is preferably rendered opaque by covering the space bordered by the outermost of said lines 27 or some of them, with a white, silver or other ink or paint as indicated by the multiplicity of dotted lines thereon. Picture *e*, for example, is a perspective view of the gearing of the wringer mechanism, drain hose, activator, activator control, gear case, pump, pump control and motor.

It will be realized that in using the folder, the salesman, instructor, or other person may open the same to expose, submit or explain the contents of any leaf desired and that the diaphanous locator D, may be arranged over such leaf to show at a glance, the relation of the parts pictured on the locator to the parts pictured on the leaf directly beneath it.

Various legends may be used on any and all of the leaves of any and all of the groups, as well as on the title page and support, some of which legends are shown, to facilitate explanation and exposition of the subject treated.

Due to the fact that different phases or submechanisms are dealt with by the units or groups A, B and C and that each group swings on a different axis, the leaves thereof may be closed and opened as groups or units to enable more expeditious location and exposition of the particular phase or submechanism or the particular leaf thereof desired for prime consideration.

It is to be understood that the term "picture" is used in the claims in a generic sense and thus especially to include printing, painting and drawing whether produced by hand or machine.

Various changes may be resorted to within the spirit and scope of the invention.

I claim:

1. A device of the class described having a support, a first series of leaves, a second series of leaves, means hinging the leaves to the support for movement of the leaves of one series on an axis at an angle to the axis of the leaves of the other series so that one series may normally be superimposed on the other series, said leaves having edge portions stepped whereby areas of the leaves of both series are exposed in normal condition, a picture delineated on and common to the uppermost surface of the uppermost leaf and said exposed areas, and a locator pivoted to the support on an axis different from the leaves for disposition over said leaves, said locator being diaphanous and having picture matter delineated thereon related to and arranged for coaction over and with the first mentioned picture.

2. A device of the class described having a support, a first series of leaves, a second series of leaves, means hinging the leaves to the support for movement of the leaves of one series on an axis different from the axis of the leaves of the other series so that one series may normally be superimposed on the other series, said leaves having edge portions stepped whereby areas of the leaves of both series are exposed in normal condition, a picture delineated on and common to the uppermost surface of the uppermost leaf and said exposed areas, and a locator pivoted to the support on an axis different from the leaves for disposition over said leaves, said locator being diaphanous and having picture matter delineated thereon related to and arranged for coaction over and with the first mentioned picture, said support having picture matter delineated thereon beyond one of the series of leaves common to and serving to lengthen the first mentioned picture.

3. A device of the class described having a support, a first series of leaves, a second series of leaves, means hinging the leaves to the support for movement of the leaves of one series on an axis at an angle to the axis of the leaves of the other series so that one series may normally be superimposed on the other series, said leaves having edge portions stepped whereby areas of the leaves of both series are exposed in normal condition, a picture delineated on and common to said exposed areas, picture portions on the leaves, said picture portions coacting with the picture delineations on the respective leaves to complete a picture and normally concealed by the leaf next above it, and a locator pivoted to the support on an axis different from the leaves for disposition over said leaves and selected ones thereof, said locator being diaphanous and having picture matter delineated thereon related to each complete picture and arranged for registration with respect to each of said pictures.

4. A device of the class described having a support, a first series of leaves, a second series of leaves, means hinging the leaves to the support for movement of the leaves of one series on an axis at an angle to the axis of the leaves of the other series so that one series may normally be superimposed on the other series, pictures on all leaves relating to a common subject, the pictures of one series relating to one phase of said subject and the pictures of the other series relating to another phase of the same subject, a locator pivoted to the support on an axis different from the leaves for disposition over said leaves and selected ones thereof, said locator being diaphanous and having picture matter delineated thereon related to both of said phases and arranged for registration with respect to each of said pictures, the arrangement of leaves enabling those related to one said phase to be displaced as a unit when those related to the other said phase are to receive prime consideration.

5. A device of the class described having a support, a first series of leaves, a second series of leaves, means hinging the leaves to the support for movement of the leaves of one series on an axis at an angle to the axis of the leaves of the other series so that one series may normally be superimposed on the other series, said leaves having edge portions stepped whereby areas of the leaves of both series are exposed in normal condition, a picture delineated on and common to said exposed areas, said picture portions coacting with the picture delineations on the respective leaves to complete a picture and normally concealed by the leaf next above it.

6. A device of the class described having a support, a first series of leaves, a second series of leaves, means hinging the leaves to the support for movement of the leaves of one series on an axis different from the axis of the leaves of the other series so that one series may normally be superimposed on the other series, pictures on all leaves relating to a common subject, the pictures of one series relating to one phase of said subject and the pictures of the other series relating to another phase of the same subject, the arrangement of leaves enabling those related to one said phase to be displaced as a unit when those related to the other said phase are to receive prime consideration.

7. A device of the class described having a support, a first series of leaves, a second series of leaves, means hinging the leaves to the support for movement of the leaves of one series on an axis at an angle to the axis of the leaves of the other series so that one series may normally be superimposed on the other series, said leaves having edge portions stepped whereby areas of the leaves of both series are exposed in normal condition, a picture delineated on and common to the uppermost surface of the uppermost leaf and said exposed areas, and a locator pivoted to the support on an axis different from the leaves for disposition over said leaves, said locator being diaphanous and having picture matter delineated thereon related to and arranged for coaction over and with the first mentioned picture, said support having angularly related edges, and said series and locator being hinged to different edges of said support.

8. A device of the class described having a support, a first series of leaves, a second series of leaves, means hinging the leaves to the support for movement of the leaves of one series on an axis at an angle to the axis of the leaves of the other series so that one series may normally be superimposed on the other series, said leaves having edge portions stepped whereby areas of the leaves of both series are exposed in normal condition, a picture delineated on and common to the uppermost surface of the uppermost leaf and said exposed areas, and a locator pivoted to the support on an axis different from the leaves for disposition over said leaves, said locator being diaphanous and having picture matter delineated thereon related to and arranged for coaction over and with the first mentioned picture, and a leaf disposed over the groups hinged on an axis parallel to that of the locator.

9. A device of the class described having a support, a first series of leaves, a second series of leaves, means hinging the leaves to the support for movement of the leaves of one series on a different axis from that of the leaves of the other series so that one series may normally be superimposed on the other series, said leaves having edge portions stepped whereby areas of the leaves of both series are exposed in normal condition, a picture delineated on and common to the uppermost surface of the uppermost leaf and said exposed areas, and a locator pivoted to the support on an axis different from the leaves for disposition over the leaves, said locator being diaphanous and having picture matter delineated thereon related to and arranged for coaction over and with the first mentioned picture.

10. A device according to claim 9 wherein one series has free marginal edges of the leaves thereof spaced from the axis of movement of the other series and intersecting and projecting beyond a marginal edge of the other series to facilitate grasping and displacement of the different series as individual units.

11. A device according to claim 9 wherein one series has free marginal edges of the leaves thereof spaced from the axis of movement of the other series and disposed immediately over the latter to facilitate grasping and displacement of the series as individual units.

MARTIN JENTER.